(12) United States Patent
Tanabe (10) Patent No.: US 7,729,255 B2
(45) Date of Patent: Jun. 1, 2010

(54) METHOD OF A SIGNAL TRANSMISSION FOR CONTROLLING A QUANTITY OF DATA TRANSMITTED AND A SIGNAL TRANSMISSION APPARATUS THEREFOR

(75) Inventor: Kazuhiro Tanabe, Iruma (JP)

(73) Assignee: Hitachi Kokusai Electric Inc., Tokyo (JP)

(*) Notice: Subject to any disclaimer, the term of this patent is extended or adjusted under 35 U.S.C. 154(b) by 1345 days.

(21) Appl. No.: 11/076,955

(22) Filed: Mar. 11, 2005

(65) Prior Publication Data

US 2005/0206740 A1    Sep. 22, 2005

(30) Foreign Application Priority Data

Mar. 22, 2004    (JP) ............................. 2004-082160

(51) Int. Cl.
| H04L 1/00 | (2006.01) |
| H04L 12/26 | (2006.01) |
| H04L 5/14 | (2006.01) |
| H04J 3/00 | (2006.01) |
| H04B 7/212 | (2006.01) |

(52) U.S. Cl. ........................ 370/235; 370/231; 370/232; 370/280; 370/294; 370/337; 370/347; 370/442; 370/498; 370/521

(58) Field of Classification Search ......... 370/230–232, 370/235, 236, 280, 294, 337, 442, 478, 498, 370/521
See application file for complete search history.

(56) References Cited

U.S. PATENT DOCUMENTS

| 4,222,074 A | * | 9/1980 | Breithaupt .................. 348/518 |
| 5,978,651 A | | 11/1999 | Eto et al. |
| 6,112,180 A | * | 8/2000 | Mitsuhashi et al. .......... 704/270 |
| 6,115,341 A | * | 9/2000 | Hirai ........................ 369/59.13 |
| 7,376,205 B1 | * | 5/2008 | Black .......................... 375/318 |
| 2001/0038610 A1 | * | 11/2001 | Decker et al. ................ 370/230 |

FOREIGN PATENT DOCUMENTS

| JP | 7-203399 | 8/1995 |
| JP | 07-322238 | 12/1995 |
| JP | 3194510 | 6/2001 |
| JP | 3390509 | 1/2003 |

* cited by examiner

Primary Examiner—Ronald Abelson
(74) Attorney, Agent, or Firm—Brundidge & Stanger, P.C.

(57) ABSTRACT

When digital signals are to be transmitted between a camera unit and a camera control unit, the distance of their transmission depends on the frequency at which the digital signals are transmitted. The higher the frequency of the digital signals is, the greater the cable attenuation is, inviting deterioration of the signals. Therefore, with a view to matching the quantity of transmitted signals with the length of the transmission path and thereby achieving high quality of signal transmission, a method of signal transmission for a signal transmission apparatus wherein a camera unit and a camera control unit for controlling the camera unit are connected by a transmission path and a video signal, an audio signal and a control signal are digitized, time division multiplexed and transmitted between the camera unit and the camera control unit, has a step of measuring the value of delay of signals transmitted over the transmission path, and each of the camera unit and the camera control unit performs a step of controlling the data quantity of signals to be delivered to the transmission path on the basis of the measured value of delay.

9 Claims, 7 Drawing Sheets

Prior Art

METHOD OF A SIGNAL TRANSMISSION FOR CONTROLLING A QUANTITY OF DATA TRANSMITTED AND A SIGNAL TRANSMISSION APPARATUS THEREFOR

FIELD OF THE INVENTION

This invention relates to the field of a method of a signal transmission and a signal transmission apparatus, and more particularly to a method of a signal transmission for multiplex bidirectional transmission of a video, an audio and a control signals and the like between two video apparatuses and a signal transmission apparatus therefor.

BACKGROUND OF THE INVENTION

For use in multiplex transmission of data including a video signal, an audio signal and a control signal between video apparatuses such as a television camera (hereinafter referred to as camera unit) and a camera control apparatus (hereinafter referred to as camera control unit), there is known an apparatus which subjects data including the video signal, the audio signal and the control signal to frequency division multiplexing and transmits the multiplexed signals over a triple coaxial cable known as a Triax cable (hereinafter referred to as transmission cable).

In Triax transmission, bidirectional transmission of the video signal, the audio signal, the control signal and the like subjected to analog frequency division multiplexing has constituted the main stream. Such analog processing is susceptible to the influences of the characteristics of the transmission cable used and those of the filter used for frequency division, often resulting in deterioration in the characteristics of the video and audio signals received in the camera unit or the camera control unit.

With a view to solving this problem, the present applicants proposed a multiplex transmission method for digital video signals and an apparatus therefor, disclosed in the Japanese Patents No. 390509 and No. 3194510 for instance. According to these patents, each of the video devices provided at the two ends of the transmission path, video signals and audio signals are digitized, subjected to time division multiplexing and compressed on the time axis to generate transmission signals consisting of repeated alternation of signal periods and non-signal periods. The transmission signals are sent from a video device connected to one end of the transmission path, and transmission signals are sent from another video device connected to the other end of the path during the non-signal periods, thereby enabling bidirectional transmission to be achieved over a single transmission path. The apparatuses embodying this principle, disclosed in the patents, are already available for practical use.

Figure 7:
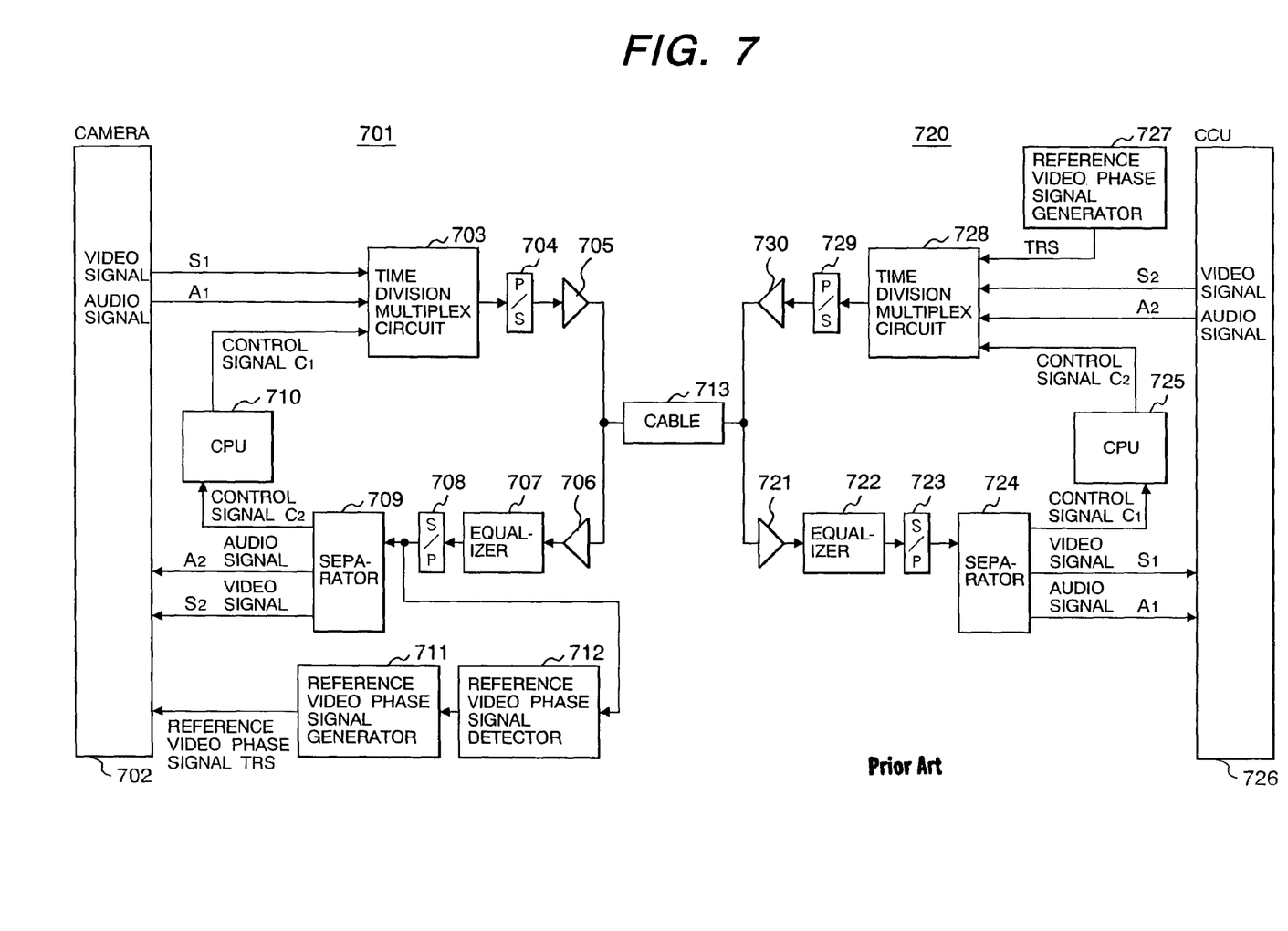
FIG. 7 is a block diagram showing a schematic configuration of one example of conventional signal transmission apparatus.

One example of conventional multiplex transmission apparatus for digital video signals will be described with reference to FIG. 7. Referring to FIG. 7, first, in a camera unit 701, a video signal S1 and an audio signal A1 from a camera 702 and a control signal C1 from a CPU 710 for controlling the camera 702 are converted into digital signals by an A/D converter (not shown), multiplexed by a time division multiplex circuit 703, converted into serial data by a parallel/serial converter 704, and supplied to an amplifier 705. The output of the amplifier 705 is transmitted to a camera control unit 720 via a cable 713 (which generally refers to the transmission path). In the camera control unit 720, the time division-multiplexed signals from the cable 713 are amplified by an amplifier 721, converted into parallel data by a serial/parallel converter 723 after being compensated for cable attenuation by an equalizer 722, and separated into a video signal S1, an audio signal A1 and a control signal C1 by a separator 724.

Similarly in the camera control unit 720, a digitized video signal S2 and a digitized audio signal A2 from a CCU 726 and a control signal C2 from a CPU 725 for controlling the CCU are inputted to a time division multiplex circuit 728. A reference video phase signal TRS (time reference signal) from a reference video phase signal generator 727 is inputted to the time division multiplex circuit 728, wherein these and other signals are multiplexed, converted into serial data by a parallel/serial converter 729, and transmitted to the camera unit 701 via an amplifier 730 and the cable 713. In the camera unit 701, time division multiplexed signals from the cable 713 are amplified by an amplifier 706, compensated for cable attenuation by an equalizer 707, converted into parallel data by a serial/parallel converter 708, and separated into the video signal S2, the audio signal A2 and the control signal C2 by a separator 709 to be supplied to the camera 702 and the CPU 710. The reference video phase signal TRS is a 10-bit digital signal consisting of a combination of (3FF) and (000), so composed that it can be identified as a TRS upon receipt of this signal.

Further in the camera unit 701, the reference video phase signal TRS is detected by a reference video phase signal detector 712, a reference video phase signal TRS is generated by a reference video phase signal generator 711 for the camera unit 701, and the latter is applied to the camera 702. Thus, the reference video phase signal TRS from the reference video phase signal generator 727 of the camera control unit 720 is detected by the camera unit 701, a reference video phase signal TRS is generated in synchronism with it, and the camera 702 is driven in synchronism with this reference video phase signal TRS.

Then, in the digital video signal multiplex transmission apparatus described above, if the various signals are simply multiplexed and serialized, the band required for signal transmission will widen. Accordingly, there are disadvantages of increased deterioration in signal characteristics due to the cable loss on the transmission path and a reduced transmittable length. In other words, though there is no deterioration, which would arise in analog transmission, within the distance in which digital signals can be transmitted (the length of the transmission path), the digital signals cannot be normally reproduced beyond the distance of digital transmittability, resulting in a state in which normal transmission is impossible.

More specifically, for instance D1 signals according to the digital signal standards instituted by SMPTE (Society of Motion Picture and Television Engineers (U.S.)), the quantity of signals that can be transmitted is 270 Mbps. D1 signals are used as main signals from the camera unit 701 to the camera control unit 720 and, the return signals R1 equivalent to 90 Mbps are used in the other way around, namely from the camera control unit 720 to the camera unit 701, because poorer video quality poses no problem in this direction. In this setting, the combined transmission quantity of the main signals D1 and the return signals R1 will be 360 Mbps. Eventually, it is required to perform bidirectional transmission in a transmission band of 360 Mbps.

On the other hand, the value of attenuation by the cable 713 increases with a rise in frequency. The case of the commonly used Triax cable, for instance, is as shown in Table 1 below.

TABLE 1

| Cable length | Frequency of transmitted signal | Attenuation value |
|---|---|---|
| 100 m | 360 MHz | −10 dB |
| 1000 m | 36 MHz | −28 dB |

Now, attenuated serial digital signals can be restored by the equalizers 707 and 722, which are compensators, but their restoration has its own limit. Thus, where the frequency of transmitted signals is high, such as 360 MHz, the value of attenuation of around −40 dB is the limit of restoration. In a simple calculation, where the frequency of transmitted signals is 360 MHz as in the case of Table 1:

$$-40 \text{ dB}/(-10 \text{ dB}/100 \text{ m})=400 \text{ m} \quad (1)$$

Thus, the maximum cable length that permits transmission is 400 m. Supposing the limit to compensation is supposed to be the same where the frequency of transmitted signals is 36 MHz:

$$-40 \text{ dB}/(-28 \text{ dB}/1000 \text{ m})=1429 \text{ m} \quad (2)$$

Thus, the maximum cable length that permits transmission is about 1.5 km.

Meanwhile, camera systems using a Triax cable are used for many different purposes. In a broadcasting station, for instance, they are more often used in studios, where the cable length is usually not more than 100 m, short enough to meet the 400 m requirement of Equation (1) and posing no particular problem as long as they are used in studios. However, when they are used outdoors for telecasting a baseball game or a golf tournament for instance, the distance between the camera unit 701 and the camera control unit 720 is in most cases more than 1 km. Though this long distance invites no deterioration where digital signals are transmitted, there is a problem of a reduction in maximum permissible cable length.

SUMMARY OF THE INVENTION

Where digital signals are to be transmitted between a camera unit and a camera control unit, the permissible distance of transmission is dependent on the frequency at which the digital signals are to be transmitted. The higher the frequency of the digital signals is, the greater the cable attenuation is. In a broadcasting station, as they are more often used in studios, the cable length is usually not more than 100 m, a length usually posing no problem. However, when they are used outdoors, often for telecasting a baseball game or a golf tournament, the required distance between the camera unit and the camera control unit is 1 km or more, posing a deterioration problem to the digital transmission of signals.

One object of the present invention is to provide a method of signal transmission by which the length of transmission path is matched with the quantity of signals to be transmitted and a signal transmission apparatus therefor.

Another object of the present invention is to provide a method of signal transmission by which the quantity of signals to be transmitted over a transmission path is controlled to match the length of the transmission path and a signal transmission apparatus therefor.

Still another object of the present invention is to provide a method of signal transmission by which the length of the transmission path is measured from the extent of delay of transmitted signals transmitted over the transmission path and a signal transmission apparatus therefor.

In order to achieve the objects stated above, according to the present invention, there is provided a method of signal transmission for use by a signal transmission apparatus wherein a camera unit and a camera control unit for controlling the camera unit are connected to each other by a transmission path, and a video signal, an audio signal and a control signal are digitized, subjected to time division multiplexing and transmitted between the camera unit and the camera control unit, the method having a step of measuring a value of delay of the signals transmitted over the transmission path, and a step of controlling on the basis of the measured value of delay the data quantity of signals delivered to the transmission path by at least one of the camera unit and the camera control unit.

According to the invention, there is also provided a version of the method of signal transmission stated above wherein the step of measuring the value of delay of the signals transmitted over the transmission path comprises a step of measuring at least the value of delay of a reference video phase signal transmitted together with signals which result from the digitization of the video signal, the audio signal and the control signal and are time division multiplexed and transmitted.

According to the present invention, there is also provided another version of the method of signal transmission stated above wherein the step of controlling on the basis of the measured value of delay the data quantity of signals delivered to the transmission path by at least one of the camera unit and the camera control unit comprises a step of reducing the data quantity of signals to be delivered to the transmission path and a step of switching over the frequency band required for the transmission.

According to the present invention, there is also provided still another version of the method of signal transmission stated above wherein the signals which result from the digitization of the video signals, audio signals and control signals and are time division multiplexed and transmitted and the reference video phase signal are transmitted in different bands.

According to the present invention, there is also provided a signal transmission apparatus comprising a camera unit, a camera control unit for controlling the camera unit and a transmission path, through which the camera unit is coupled with the camera control unit, wherein signals resulting from the digitization and time division multiplexing of a video signal, an audio signal and a control signal are transmitted over the transmission path; at least one of the camera unit and the camera control unit has a data quantity controlling unit for controlling the data quantity of signals to be delivered to the transmission path; the camera control unit has a delayed value measuring unit for measuring the value of delay of signals transmitted over the transmission path; and the data quantity controlling unit is controlled on the basis of an output signal of the delayed value measuring unit.

According to the present invention, there is also provided a version of the signal transmission apparatus described above wherein the delayed value measuring unit for measuring the value of delay of signals transmitted over the transmission path comprises a reference video phase signal generator which generates a reference video phase signal to be transmitted together with the signals resulting from the digitization and time division multiplexing of the video signal, the audio signal and the control signal, and means of measuring the value of delay obtained in a case where the reference video phase signal from the reference video phase signal generator is transmitted over the transmission path.

According to the present invention, there is also provided another version of the signal transmission apparatus described above wherein the data quantity controlling unit which at least one of the camera unit and the camera control unit has and which controls the data quantity of signals to be delivered to the transmission path comprises a data quantity reducing unit for reducing the data quantity of signals to be delivered to the transmission path and a frequency band switching unit for switching over the frequency band required for transmission.

According to the present invention, there is also provided still another version of the signal transmission apparatus described above wherein each of the camera unit and the camera control unit has an equalizer which compensates for the value of attenuation of the signals transmitted over the transmission path, and the value of compensation of the attenuation by the equalizer is controlled on the basis of the output signal of the data quantity controlling unit.

According to the present invention, there is also provided yet another version of the signal transmission apparatus described above wherein the equalizer which at least one of the camera unit and the camera control unit has is replaced by a pre-emphasis circuit.

The above and other objects, features and advantages of the present invention will be apparent from the following detailed description of illustrative embodiments which is to be read in connection with the accompanying drawings.

DETAILED DESCRIPTION OF THE ILLUSTRATED EMBODIMENTS

According to the present invention, it is possible even for D1 signals to be reduced in data quantity to $\frac{1}{10}$ or even less by using data compression based on high-efficiency coding. A reduction in data quantity further enables the clock rate of transmission to be reduced and the frequency band of transmission to be narrowed. If, for instance, 360 Mbps signals are compressed to 36 Mbps signals, the maximum cable length permitting transmission will be extended to around 1.5 km as indicated by Equation (2), and users' pertinent needs can be satisfied. In this case, however, video quality will be deteriorated by the data compression. There would arise the kinds of noise generally known as block noise and mosquito noise. These kinds of noise occur irrespective of the cable length, even where the cable length is short. Therefore, this is a disadvantage in a studio environment.

According to the present invention, there is provided means of reducing the data quantity by data compression or otherwise, bringing down the clock rate to match data quantity reducing means and lowering the frequency band required for transmission and, if the cable length of the transmission path is too great, carrying out transmission in a narrowed transmission band with the data quantity reducing means or, if the cable length is short, carrying out digital transmission without compression by the same method as the conventional.

Figure 2:
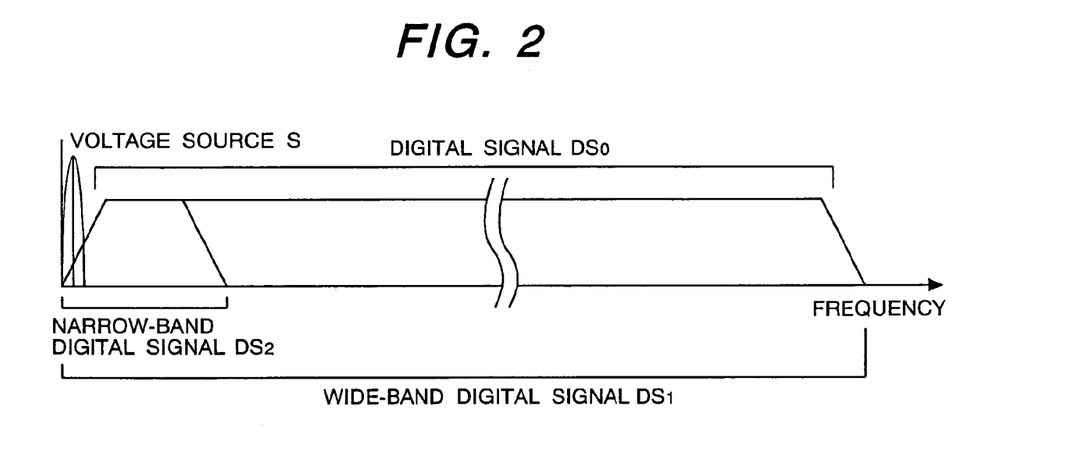
FIG. 2 shows the transmission band of signals for describing the principle of the present invention.

FIG. 2 shows the transmission band of signals for describing the principle of the present invention, schematically illustrating the frequency band of transmitting digital signals over the transmission cable 713 (generally the transmission path). Referring to FIG. 2, a digital signal $DS_0$ is a digital signal resulting from the multiplexing of a video signal, an audio signal and a camera control signal sent from the camera unit 701 to the camera control unit 720 and return signals (including a video signal, an audio signal and a control signal) from the camera control unit 720 to the camera unit 701. A wideband digital signal $DS_1$ represents the frequency band of this digital signal $DS_0$. A narrow-band digital signal $DS_2$ represents the frequency band of the digital signal $DS_0$ as compressed by a prescribed compressor. A voltage source S represents the A.C. source voltage supplied from the camera control unit 720 to the camera unit 701 via the transmission cable 713.

Where the transmission path is short, the value of attenuation is also small, and accordingly the transmission of the wide-band digital signal $DS_1$ is possible. However, where the transmission path is long, the high-frequency component is subject to serious deterioration due to attenuation, which cannot be compensated for, and accordingly the band of a transmittable signal is narrowed. Thus, the narrow-band digital signal $DS_2$ is transmitted. According to the present invention, these two types of signals including the wide-band digital signal DSL and the narrow-band digital signal $DS_2$ are switched over between each other according to the length of the transmission path (the distance). In other words, the data quantity to be transmitted is reduced to depend on the length of the transmission path, the transmission band is switched over to depend on the reduced data quantity, and the data are transmitted on that basis.

Figure 1:
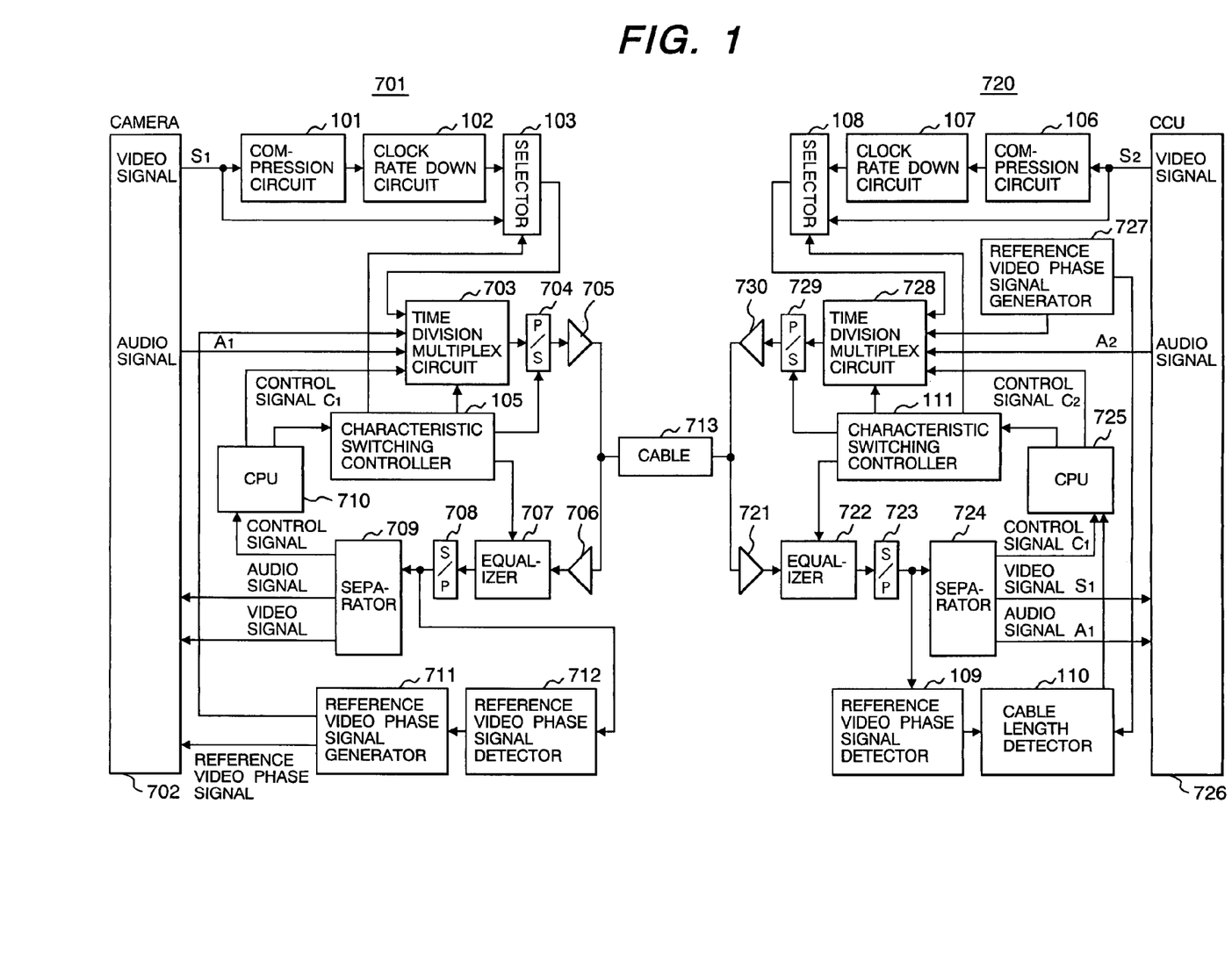
FIG. 1 is a block diagram showing a schematic configuration of a preferred embodiment of the present invention.

FIG. 1 is a block diagram showing a schematic configuration of a preferred embodiment of the present invention. Referring to FIG. 1, first the flow of data from the camera unit 701 to the camera control unit 720 will be described. A video signal $S_1$ from the camera 702 is converted into a digital signal by an A/D converter (not shown), and the digital signal undergoes compressive coding by a compressor 101 (reduced in data quantity). A number of methods are available for compressive coding including, for instance, a method by which the data quantity is reduced by data compression based on high-efficiency coding such as MPEG (Moving Picture Experts Group) 2 or MPEG 4, another by which the data quantity is reduced by limiting the frequency band of the baseband with a filter, and still another by which the data quantity is reduced by lowering the accuracy of quantization in quantizing video images. Obviously, any of these methods can be used.

The compressed video signal having gone through any of these compression processes are lowered in effective clock rate by a clock rate down circuit 102. Where, for instance, the clock frequency of the video signal picked up by a charge coupled device (CCD) is 22 MHz, it is reduced by the clock rate down circuit 102 to, for example, around 14.3 MHz. The output of the clock rate down circuit 102, namely the narrow-band digital signal $DS_2$ shown in FIG. 2 for instance, is supplied to a selector 103. Further, the signal resulting from the A/D conversion of the video signal $S_1$ (an uncompressed signal), namely the wide-band digital signal $DS_1$ for instance, is supplied to the selector 103. Then, the selector 103 selects either the wide-band digital signal $DS_1$ or the narrow-band digital signal $DS_2$. The method of this selection will be described afterwards.

The video signal selected by the selector 103 is supplied to the time division multiplex circuit 703. At the same time, a digital audio signal resulting from the A/D conversion of the audio signal $A_1$ and the control signal $C_1$ are supplied to the time division multiplex circuit 703. After the video signal, the audio signal and the control signal are multiplexed by the time division multiplex circuit 703, the multiplexed signals are converted into serial signals by the parallel/serial converter 704 as in the case shown in FIG. 7, and the converted signals are delivered to the cable 713 via the amplifier 705.

The multiplexed signals sent via the cable 713, after being compensated for cable attenuation by the equalizer 722 via the amplifier 721 in the camera control unit 720, converted into parallel signals by the serial/parallel converter 723, and separated by the separator 724 into the video signal, the audio signal and the control signal, which are supplied to the CCU (camera control unit) 726 and the CPU 725.

In the flow of signals from the camera control unit 720 to the camera unit 701, as in the foregoing case, the video signal $S_2$ of the CCU 726 is converted into the digital signal by an A/D converter (not shown), and reduced in data quantity by a compressor 106 (the method of compression is the same as that for the compressor 101 described above) to be lowered in effective clock rate by a clock rate down circuit 107. The output of the clock rate down circuit 107 and the digital signal resulting from the A/D conversion of the video signal $S_2$ of the CCU 726 (uncompressed signals) are supplied a selector 108, which selects either the signal reduced in clock rate or the signal having gone through no compression at all. The method of this selection will be described afterwards.

The video signal from the selector 108, the digital audio signal resulting from digitization of the audio signal $A_2$ and the control signal $C_2$ from the CPU 725, after being multiplexed by the time division multiplex circuit 728, are converted by the parallel/serial converter 729 into serial signals, which are supplied to the cable 713 via the amplifier 730.

The multiplexed signals sent via the cable 713 are supplied to the equalizer 707 via the amplifier 706 of the camera unit and, after being compensated for cable attenuation, converted by the serial/parallel converter 708 into parallel signals, which are separated by the separator 709 into the video signal, the audio signal and the control signal.

Next will be described the operations of the selectors 103 and 108. First, where the length of the cable 713 is short, the selectors 103 and 108 select, under the control of characteristic switching controllers 105 and 111, uncompressed digital video signals from the camera 702 or the CCU 726. In response to this selection, the signal processing rates of the time division multiplex circuit 703 and 728 are raised, and the compensation characteristics of the equalizers 707 and 722 are also switched over to those appropriate for the compensation of a wide band.

On the other hand, where the cable 713 is long, the selectors 103 and 108 select, under the control of the characteristic switching controllers 105 and 111, compressed digital video signals from the clock rate down circuit 102 and 107. In response to this selection, the signal processing rates of the time division multiplex circuit 703 and 728 are lowered, and the compensation characteristics of the equalizers 707 and 722 are also switched over to those appropriate for compensation of a narrow band. In this way, selection is made as to whether or not to compress the transmitted signals according to the length of the cable 713, making it possible to transmit signals optimally suited to the length of the cable. Incidentally, though the foregoing description of this embodiment referred to a case in which selection is made as to whether or not to compress the transmitted signals according to the length of the cable, the selection is not limited to this, but the characteristics of the transmitted signals can be easily varied according to the length of the transmission path by altering the rate of compression of the transmitted signals for instance.

Next, a method of specifying the cable length will be described with reference to FIG. 1 and FIG. 3. First, when the voltage supply to the apparatus is turned on or when the cable 713 connecting the camera unit 701 and the camera control unit 720 is cut off and connected again, first a sequence of measuring the cable length is started. In this cable length measuring sequence, first, both the camera unit 701 and the camera control unit 720 measure the cable length in a narrow-band mode. It is done in the narrow-band mode, because the cable length is unknown, so that signals for measuring the cable length are not limited by the cable 713, namely the signals can be sufficiently transmitted irrespective of the length of the cable.

Figure 3:
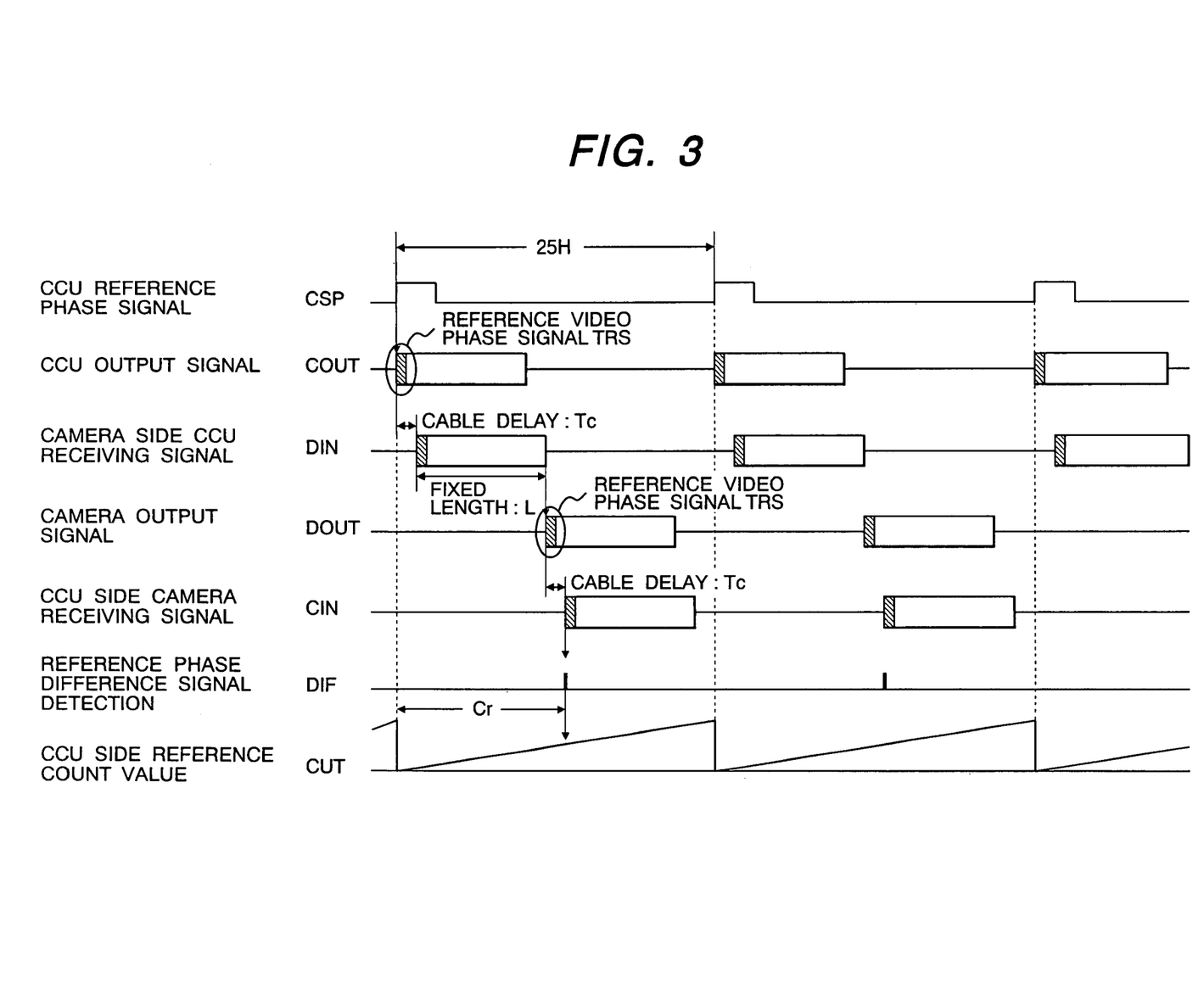
FIG. 3 shows a sequence for describing the embodiment of the present invention cited above.

Referring to FIG. 3, in the camera control unit 720, CCU reference phase signals CSP are generated in 25H (H: 1 horizontal scanning period), for instance, to actuate the reference video phase signal generator 727. Hereupon, a case in which the camera control unit 720 and the camera unit 701 repeat bidirectional transmission on a time division multiplex basis in specific cycles will described. The reference video phase signal generator 727 generates the reference video phase signal TRS (time reference signal), which is multiplexed by the time division multiplex circuit 728, and a CCU output signal COUT, to which the reference video phase signal TRS is added, is obtained as its output. This CCU output signal COUT is transmitted to the camera unit 701 via the cable 713. In the camera unit 701, the reference video phase signal detector 712 detects the reference video phase signal TRS. With reference to this TRS, the reference video phase signal generator 711 is caused to generate a reference video phase signal TRS anew, and this TRS is supplied to the camera 702. As a result, the TRS controls the operation of the camera unit 701. At the same time, when the CCU output signal COUT is to be received, this reference video phase signal TRS is recognized as the leading signal in performing reception. Therefore, both the camera control unit 720 and the camera unit 701 operate with reference to this reference video phase signal TRS.

When signals are to be sent from the camera unit 701 to the camera control unit 720 as well, after all the signals from the camera control unit 720 have been received, the reference video phase signal TRS generated by the reference video phase signal generator 711 are multiplexed with the output signal by the time division multiplex circuit 703. Since the length of the CCU output signal is determined in advance, namely 25H in FIG. 3, the timing at which the CCU output signal COUT from the camera control unit 720 is such that it can be received after waiting only 25H from the leading reference video phase signal TRS. In the camera control unit 720, a reference video phase signal detector 109 detects the reference video phase signal TRS out of multiplexed signals sent via the cable 713, and receives transmitted signals from the camera unit 701 with reference to this. At the same time, a cable length detector 110 detects the phase difference between the reference video phase signal TRS detected by the reference video phase signal detector 109 and the original reference video phase signal TRS earlier generated by the reference video phase signal generator 727 of the camera control unit 720.

The detection of this phase difference will now be described with reference to the time chart of FIG. 3, wherein the delay time on the cable 713 is represented by Tc. Incidentally, delays in the camera control unit 720 and the camera unit 701 will be ignored because they are insignificant. The signal to which the reference video phase signal TRS has been added by the camera control unit 720 arrives at the camera unit 701 after the cable delay time Tc. This signal is shown as a camera side CCU receiving signal DIN. In the camera unit 701, after a delay time "L" equivalent to the length of the camera side CCU receiving signal DIN with reference to the reference video phase signal TRS, the signal is delivered to the camera control unit 720. On this occasion, the reference video phase signal TRS generated by the reference video phase signal generator 711 is added to the leading edge of the signal. A camera output signal DOUT, after the delay time Tc on the cable 713, reaches the camera control unit 720. The signal then is represented by a CCU side camera receiving signal CIN in FIG. 3. In the camera control unit 720, the reference video phase signal detector 109 detects the reference video phase signal TRS from the CCU side camera receiving signal CIN. The cable length detector 110, configured of a counter for instance, detects a reference phase difference signal DIF representing the difference between the reference video phase signal TRS from the reference video phase signal detector 109 and the original reference video phase signal TRS from the reference video phase signal generator 727, and can detect a reference count CUT by counting this reference phase difference signal DIF. Thus, the value of this reference count CUT being represented by Cr, Cr is given by Equation (3), and accordingly the cable delay time Tc can be figured out by Equation (4).

$$Cr = Tc + L + Tc \quad (3)$$

$$Tc = (Cr - L)/2 \quad (4)$$

Therefore, the appropriate transmission band can be determined from the cable delay time Tc. To add, the relationships among the cable delay time Tc, the appropriate transmission band and the cable length (generally the length of the transmission path) are prescribed in advance experimentally, and recorded as tables in the ROMs of the CPUs 710 and 725 for instance.

Where, for instance, the delay time is expected to be shorter than the predetermined length from Equation (4) above, as it is judged that the transmission path is short (e.g. within 1 km) and the value of attenuation is also small, the transmission of the wide-band digital signals $DS_1$ is considered possible. Therefore, the CPUs 710 and 725 control the characteristic switching controllers 105 and 111, the selectors 103 and 108 select uncompressed video signals, the time division multiplex circuits 703 and 728 raise the signal processing rates and the compensation characteristics of the equalizers 707 and 722 are switched over to those appropriate for the compensation of a wide band.

On the other hand, where the delay time is expected to be longer than the predetermined length from Equation (4) above, as it is judged that the transmission path is long (e.g. 1 km or more) and the band of transmittable signals becomes narrower, the narrow-band digital signals $DS_2$ are transmitted. Therefore, the CPUs 710 and 725 control the characteristic switching controllers 105 and 111, the selectors 103 and 108 select compressed video signals and the equalizer 707 and 722 are switched over to those appropriate for compensation of a narrow band. Incidentally, the cable length detector 110 may as well be a delay time detector. Further, obviously the CPUs 710 and 725 are mutually controlled with control signals.

To add, though the foregoing description of this embodiment referred to a case in which both the camera unit 701 and the camera control unit 720 switch over the characteristics of the transmitted signals, a configuration in which only one of them switches over the characteristics is also conceivable. The same holds true of other embodiments of the present invention described below.

Figure 4:
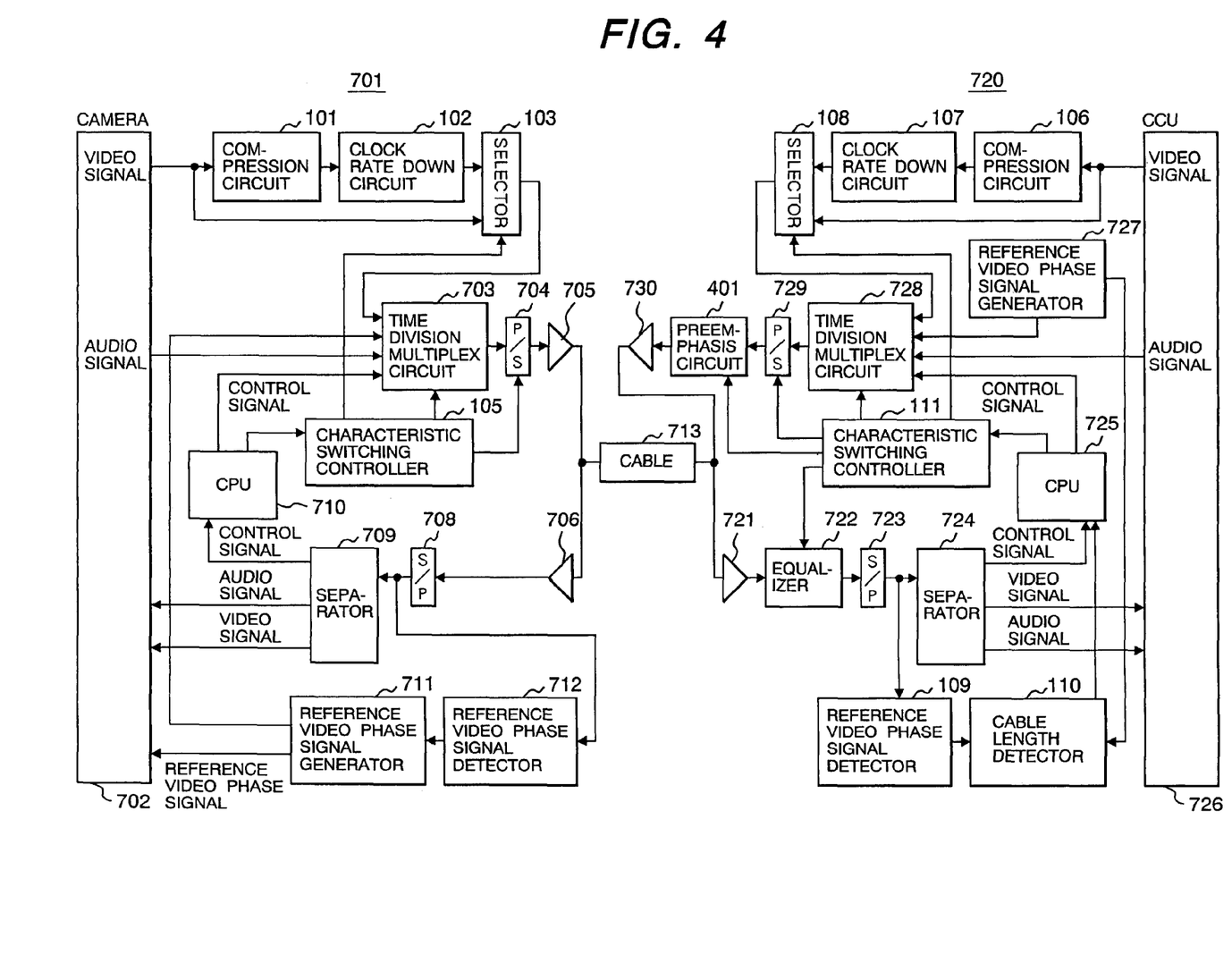
FIG. 4 is a block diagram showing a schematic configuration of another preferred embodiment of the present invention.

FIG. 4 is a block diagram showing a schematic configuration of another preferred embodiment of the present invention. In FIG. 4, reference numeral 401 denotes a pre-emphasis circuit. The same elements as in FIG. 1 are denoted by respectively the same reference numerals. While the camera unit 701 and the camera control unit 720 are individually provided with the equalizers 707 and 722, respectively, in the embodiment shown in FIG. 1, in this embodiment the camera unit 701 is deprived of the equalizer 707 and instead the camera control unit 720 is provided with the pre-emphasis circuit 401. Thus, while the equalizer 707 is intended to compensate for the cable attenuation on the cable 713, in the embodiment shown in FIG. 4 the camera control unit 720 is provided with the pre-emphasis circuit 401, and the emphasis characteristics of the pre-emphasis circuit 401 are switched over under the control of the characteristic switching controller 111 to depend on the length of the cable 713 to compensate for attenuation on the cable 713 in advance. Incidentally, since the operation of the embodiment shown in FIG. 4 is similar to that of the embodiment shown in FIG. 1, its detailed description is dispensed with. Similarly, a configuration in which the camera control unit 720 is deprived of the equalizer 722, instead a pre-emphasis circuit (not shown) is provided between the parallel/serial converter 704 and the amplifier 705 of the camera unit 701, and the emphasis characteristics of the pre-emphasis circuit are switched over under the control of the characteristic switching controller 105 to depend on the length of the cable 713 to compensate for attenuation on the cable 713 in advance can be readily realized.

Figure 5:
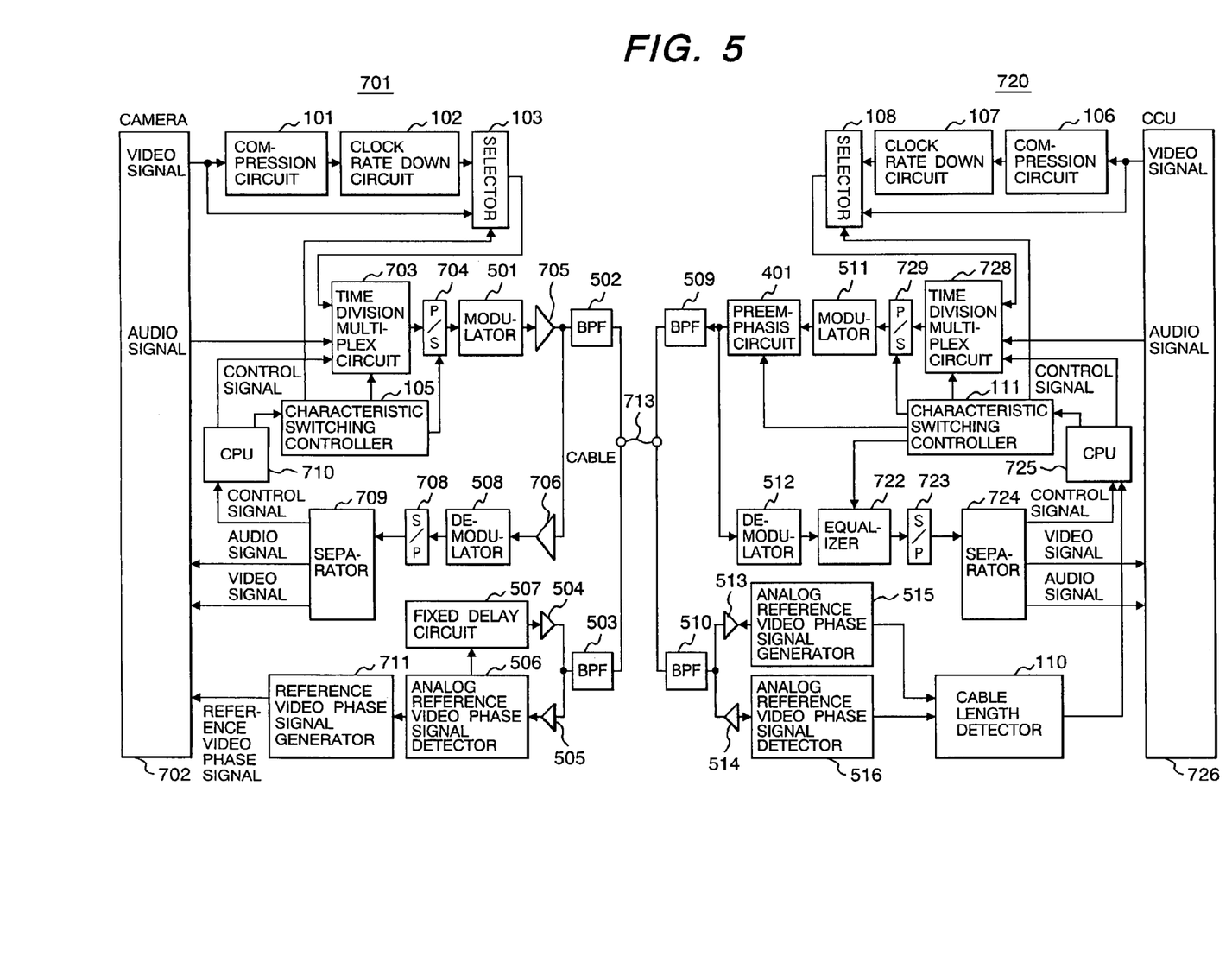
FIG. 5 is a block diagram showing a schematic configuration of still another preferred embodiment of the present invention.
Figure 6:
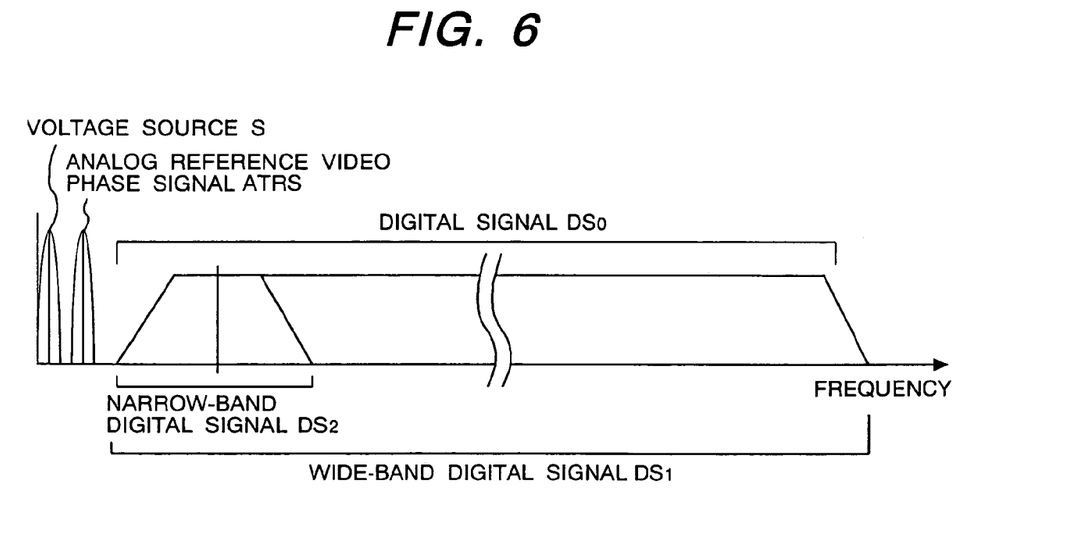
FIG. 6 shows the transmission band of signals for describing the principle of the embodiment of the present invention shown in FIG. 5.

FIG. 5 is a block diagram showing a schematic configuration of still another preferred embodiment of the invention. With respect to the embodiment illustrated in FIG. 1, a case in which the reference video phase signal TRS is subjected to time division multiplexing together with the video signal, the audio signal and the control signal as in, for instance, the CCU output signal COUT shown in FIG. 3, but the embodiment shown in FIG. 5 uses a system in which an analog reference video phase signal ATRS is subjected to modulation multiplexing in a different band from the wide-band digital signal $DS_1$ of the video signal, the audio signal and the control signal as shown in FIG. 6. This embodiment will be described below with reference to FIG. 5 and FIG. 6. In FIG. 5, reference numerals 501 and 511 denote modulators; 508 and 512 denote demodulators; 502, 503, 504, 505, 513 and 514 denote amplifiers; 502, 503, 509 and 510 denote band pass filters; 506 and 516 denote analog reference video phase signal detectors; 507 denotes a fixed delay circuit; and 515 denotes an analog reference video phase signal generator. Incidentally, the same elements as in FIG. 1 and FIG. 4 are denoted by respectively the same reference numerals.

Referring to FIG. 5, the time division multiplex circuit 728 subjects the video signal, the audio signal and the control signal to time division multiplexing, and the multiplexed signals are supplied to the modulator 511 via the parallel/serial converter 729. The modulator 511 modulates them into the band of the wide-band digital signal $DS_1$ as shown in FIG.

6, and the modulated signals are supplied to the cable 713 via the pre-emphasis circuit 401 and the band pass filter 509. On the other hand, an analog reference video phase signal ATRS (shown in FIG. 6) generated by the analog reference video phase signal generator 515 is arranged in a band different from that of the wide-band digital signal $DS_1$, and supplied to the cable 713 via the amplifier 513 and the band pass filter 510. Therefore, the band of the signals transmitted over the cable 713 is as shown in FIG. 6.

Out of the signals transmitted over the cable 713, the time division multiplexed signals deriving from the video signal, the audio signal and the control signal are separated by the band pass filter 502 from the analog reference video phase signal ATRS and supplied to the demodulator 508 via the amplifier 706, where they are demodulated and supplied to the separator 709 via the serial/parallel converter 708. Similarly, the time division multiplexed signals resulting from the multiplexing of the video signal, the audio signal and the control signal by the time division multiplex circuit 703 are modulated by the modulator 501 into the band of the wide-band digital signal $DS_1$ as shown in FIG. 6, and supplied to the separator 724 via the band pass filter 502, the cable 713, the band pass filter 509, the demodulator 512 and so forth.

On the other hand, out of the signals transmitted over the cable 713, the analog reference video phase signal ATRS is separated by the band pass filter 503 and supplied to the analog reference video phase signal detector 506 via the amplifier 505, where the analog reference video phase signal ATRS is detected. The detected analog reference video phase signal ATRS causes the reference video phase signal generator 711 to generate a reference video phase signal TRS anew, in synchronism with which all the equipment items of the camera unit 701 are driven.

Further, the output of the analog reference video phase signal detector 506, after being delayed by the fixed delay circuit 507 equivalently to the fixed length L shown in FIG. 3, is supplied via the amplifier 504, the band pass filter 503, the cable 713, the band pass filter 510 and the amplifier 514 to the analog reference video phase signal detector 516, where the analog reference video phase signal ATRS delivered from the camera unit 701 is detected. Therefore, the analog reference video phase signal ATRS from the analog reference video phase signal detector 516 and the original analog reference video phase signal ATRS from the analog reference video phase signal generator 515 are compared by the cable length detector 110. Since the cable delay time Tc is figured out as a result in the same way as Equations (3) and (4), it is possible to transmit signals of transmission characteristics depending on the cable length as described with reference to the embodiment of FIG. 1. Detailed description of this operation is dispensed with, because it is basically the same as what was earlier described apart from the difference between analog and digital.

As hitherto described, also where the reference video phase signal TRS is to be transmitted as part of the time division multiplexed signals together with the video signal, the audio signal and the control signal, or where the analog reference video phase signal ATRS is subjected to modulation multiplexing in another band from the time division multiplexed signals deriving from the video signal, the audio signal and the control signal, the objects of the present invention can be achieved. To add, though the pre-emphasis circuit 401 is used in the embodiment shown in FIG. 5, the use of an equalizer as shown in FIG. 1 can also be readily realized.

As described so far, according to the invention, it is possible to achieve long-distance transmission, though it is high-quality digital transmission, as in analog transmission. Furthermore, by reducing the data quantity by data compression or otherwise, reducing the clock rate to depend on the data quantity reducing means and lowering the frequency band required for transmission, it is made possible to reduce the data quantity and perform transmission in a narrowed transmission band where the transmission path is long, and to perform digital transmission without compression in a method similar to the conventional where the length of the transmission path is short, resulting in an advantage of permitting high-quality signals irrespective of the length of the transmission path.

It will be appreciated while particular embodiments of the invention have been shown and described, modifications may be made. It is intended in the claims to cover all modifications which come within the true spirit and scope of the invention.

What is claimed is:

1. A method of a signal transmission for use in a signal transmission apparatus wherein a camera unit and a camera control unit for controlling said camera unit are coupled through a transmission path, and signals including at least a video signal, an audio signal and a control signal are digitized, time division multiplexed and transmitted between said camera unit and said camera control unit, said method comprising the steps of:
   compressing said signals which are digitized and turning into narrow-band digital signals, when said transmission path connecting said camera unit and said camera control unit is cut off and connected again and said transmission path is determined to exceed a predetermined length;
   measuring a value of delay of said narrow-band digital signals transmitted through said transmission path; and
   controlling on the basis of the measured value of delay of said narrow-band digital signals the data quantity of said signals delivered through said transmission path by each of said camera unit and said camera control unit.

2. A method of a signal transmission according to claim 1, wherein the step of measuring the value of delay of said narrow-band digital signals transmitted through said transmission path comprises a step of measuring a value delay of a reference video phase signal transmitted together with said signals which are digitized, time division multiplexed and transmitted.

3. A method of a signal transmission according to claim 1, wherein the step of controlling on the basis of said measured value of delay of said narrow-band digital signals the data quantity of said signals delivered to said transmission path by each of said camera unit and said control unit comprises a step of reducing the data quantity of said signals to be delivered through said transmission path and said step of compressing said signals which are digitized and turning into said narrow-band digital signals.

4. A method of a signal transmission according to claim 2, wherein the signals which are digitized and time division multiplexed at least said video signal, said audio signal and said control signal and said reference video phase signal are transmitted in different bands.

5. A signal transmission apparatus comprising:
   a camera unit;
   a camera control unit for controlling said camera unit; and
   a transmission path coupled said camera unit with said camera control unit;
   wherein signals including at least a video signal, an audio signal and a control signal are digitized, time division multiplexed and transmitted through said transmission path;

each of said camera unit and said control camera unit comprises a data quantity controlling unit for controlling the data quantity of said signals to be delivered through said transmission path;

said camera unit and said camera controlling unit comprise a frequency band switching unit for switching over the frequency band required for a signal transmission between said camera unit and said camera control unit by compressing said signals which are digitized and turning into narrow-band digital signals when said transmission path connecting said camera unit and said camera control unit is cut off and connected again and said transmission path is determined to exceed a predetermined length;

said camera control unit comprises a data quantity controlling unit for controlling the data quantity of said narrow-band digital signals to be delivered through said transmission path;

said camera control unit comprises a delayed value measuring unit for measuring a value of delay of said narrow-band digital signals transmitted through said transmission path; and said data quantity controlling unit is controlled on the basis of an output signal of said delayed value measuring unit.

6. A signal transmission apparatus according to claim 5, wherein said delayed value measuring unit for measuring the value of delay of said narrow-band digital signals transmitted through said transmission path comprises a reference video phase signal generator which generates a reference video phase signal to be transmitted together with said signals digitized and time division multiplexed at least said video signal, said audio signal and said control signal and means for measuring the value of delay obtained in a case where the reference video phase signal from said reference video phase signal generator is transmitted through said transmission path.

7. A signal transmission apparatus according to claim 5, wherein said data quantity controlling unit which each of said camera unit and said camera control unit has and which controls the data quantity of said signals to be delivered through said transmission path comprises a data quantity reducing unit for reducing the data quantity of said signals to be delivered through said transmission path and said frequency band switching unit for compressing said signals which are digitized and turning into said narrow-banded digital signals.

8. A signal transmission apparatus according to claim 5, wherein each of said camera unit and said camera control unit comprises an equalizer which compensates for the attenuation of said signals transmitted through said transmission path, and the value of compensation of the attenuation by said equalizer is controlled on the basis of the output signal of said data quantity controlling unit.

9. A signal transmission apparatus according to claim 8, wherein at least one of the equalizers which said camera unit and said camera control unit have is replaced by a pre-emphasis circuit.

* * * * *